(12) United States Patent
Senda et al.

(10) Patent No.: US 6,437,481 B2
(45) Date of Patent: *Aug. 20, 2002

(54) CONTROL DEVICE FOR VIBRATION TYPE MOTOR AND APPARATUS USING THEREOF

(75) Inventors: Akira Senda, Tokyo; Noboru Suzuki, Utsunomiya, both of (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,893

(22) Filed: Dec. 28, 1998

(30) Foreign Application Priority Data

Jan. 8, 1998 (JP) .......................... 10-002159
Dec. 16, 1998 (JP) .......................... 10-357619

(51) Int. Cl.[7] ................................ H02N 2/00
(52) U.S. Cl. ...................................... 310/317
(58) Field of Search ................. 310/317, 341, 310/316.01, 316.02

(56) References Cited

U.S. PATENT DOCUMENTS

| 5,214,339 A | * | 5/1993 | Naito ........................ 310/316 |
| 5,500,578 A | * | 3/1996 | Kawamura .................. 310/316 |
| 5,969,464 A | * | 10/1999 | Nakano et al. ........... 310/316.01 |
| 6,054,795 A | * | 10/1999 | Yamamoto et al. ...... 310/316.01 |

FOREIGN PATENT DOCUMENTS

| JP | 6-160100 | * | 6/1994 | .................. 310/341 |
| JP | 06-315283 | * | 6/1994 | .................. 310/341 |

* cited by examiner

Primary Examiner—Thomas M. Dougherty

(57) ABSTRACT

This invention relates to a driving device for a vibration type motor. According to this invention, maximum speed data of the motor is obtained in accordance with the temperature, and the speed is controlled using the data as an upper limit, thereby properly driving the vibration type motor.

32 Claims, 14 Drawing Sheets

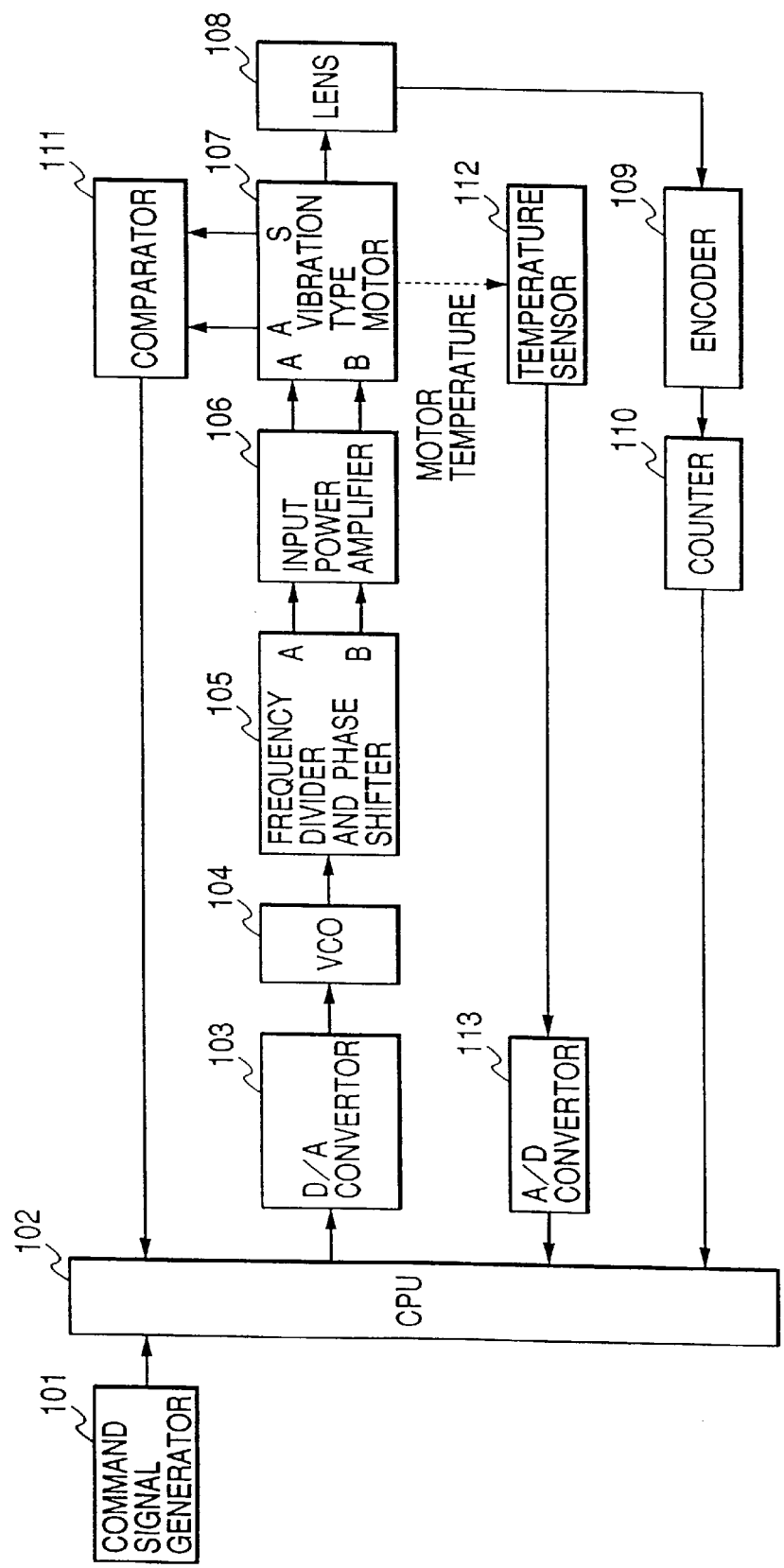

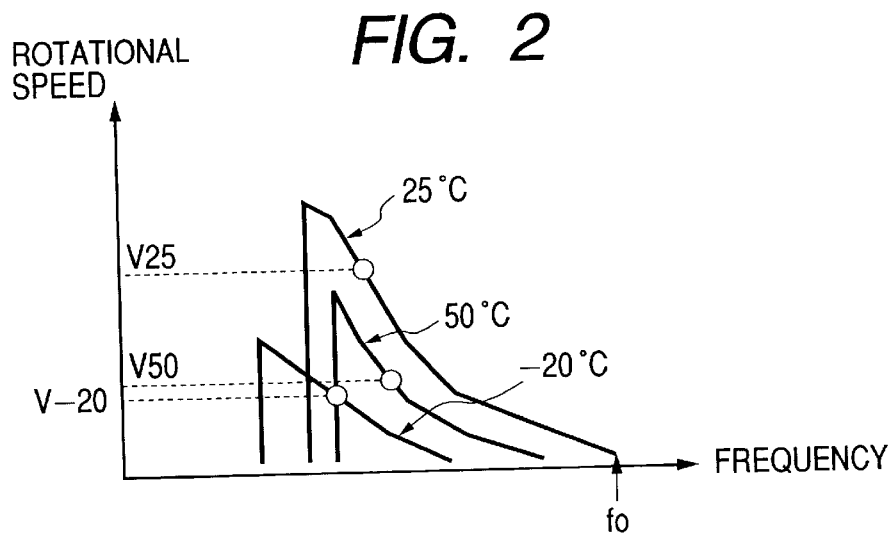
FIG. 2
FIG. 3
| TEMPERATURE (°C) | COMMANDED MAXIMUM SPEED VALUE (rpm) |
|---|---|
| -20 | 18 |
| -10 | 24 |
| 0 | 30 |
| 10 | 34 |
| 25 | 35 |
| 50 | 30 |
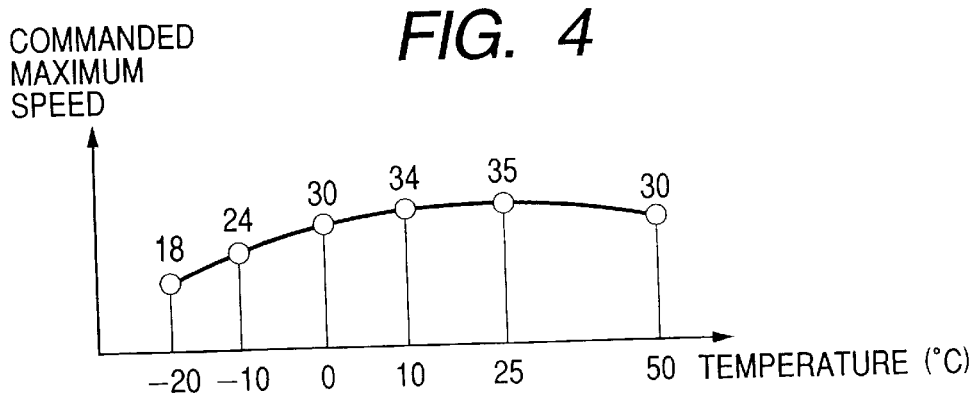
FIG. 4

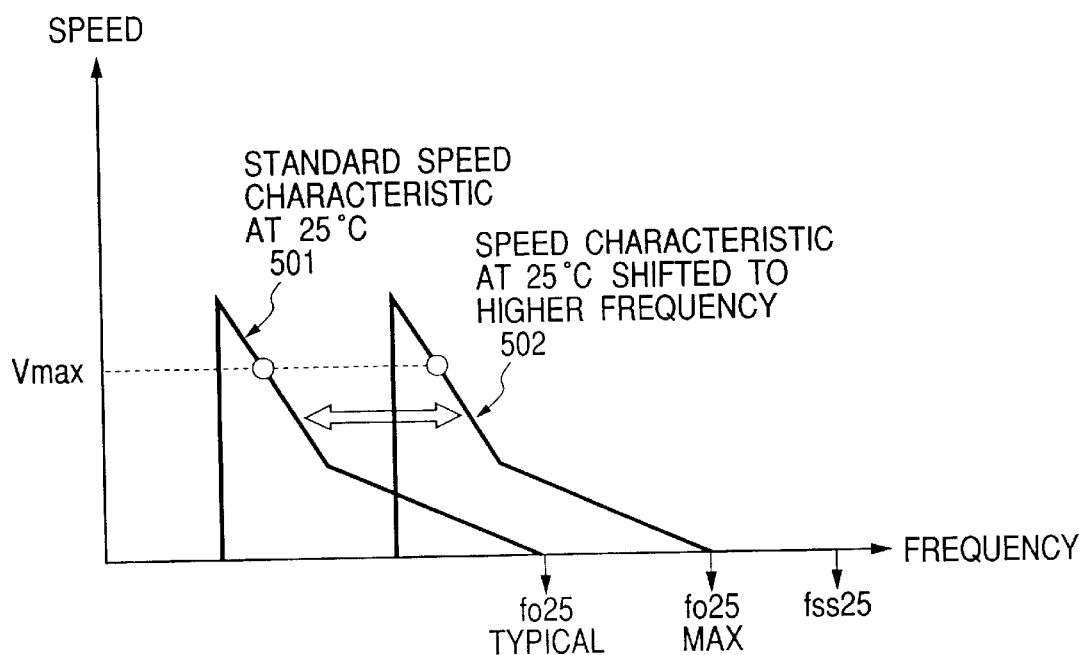

CONTROL DEVICE FOR VIBRATION TYPE MOTOR AND APPARATUS USING THEREOF

BACKGROUND OF THE INVENTION

1. Field of the Invention

The present invention relates to a control device for a vibration type motor which is used as a driving source for a video camera or video camera lens, and relatively drives a vibration member and a contact member in contact with the vibration member using a travelling vibration wave generated on the surface of the vibration member by applying a periodic voltage to an electromechanical energy conversion element such as an electrostrictive element or piezoelectric element.

2. Related Background Art

A conventional control device for a vibration type motor is constituted as shown in FIG. 18. FIG. 18 shows the case in which the vibration type motor controls the lens position of a camera.

Referring to FIG. 18, a D/A convertor 203 converts a digital output signal from a microcomputer (CPU) 202 into a voltage output. A VCO 204 outputs a periodic voltage corresponding to the output voltage obtained by the D/A convertor 203.

A frequency divider and phase shifter 205 divides the frequency of the periodic voltage output from the VCO 204 to output rectangular waves A and B having a phase difference of $\pi/2$ between them. An input power amplifier 206 amplifies the periodic voltage from the frequency divider and phase shifter 205 to a voltage and current capable of driving a vibration type motor 207. The vibration type motor 207 generates a travelling vibration wave on the surface of a vibration member by the periodic voltages A and B applied from the input power amplifier 206, thereby rotating a moving member (contact member) in contact with the vibration member.

An encoder 209 is mechanically connected to a lens 208 together with a counter 210 to detect the moving amount of the lens 208. A comparator 211 detects the phase difference between a sensor electrode S incorporated in the vibration type motor 207 and the applied periodic voltage A to inform the CPU 202 of a resonance state of the vibration type motor.

The CPU 202 calculates the difference between target position information indicated by a command signal generator 201 and position information of the lens 208 obtained by the counter 210, and outputs a digital signal to the D/A convertor 203 so as to make the lens position coincide with the target position.

FIG. 15 shows the relationship between the lens moving speed and the lens position. The lens moving speed changes in a trapezoidal shape using the maximum speed as an upper side with respect to target position information from the command signal generator 201. Referring to FIG. 18, the CPU 202 calculates the difference between target position information indicated by the command signal generator 201 and position information of the lens 208 obtained by the counter 210, and gradually increases the moving speed to keep the maximum speed for a given period. As the lens position comes near the target position, the CPU 202 outputs a digital signal to the D/A convertor 203 so as to decrease the moving speed to make the lens position coincide with the target position.

FIG. 15 shows the case wherein the start position is sufficiently distant from the target position. For a short distance, the moving speed does not reach a set maximum speed.

However, conventional control may fail due to changes in resonance characteristics of the vibration type motor.

FIG. 19 shows conventional control together with the characteristic of the vibration type motor. In FIG. 19, the motor rotational speed characteristic is hilly with respect to the frequency along the abscissa. At position o on this hilly characteristic, a stable maximum speed is attained. The left driving frequency range from the peak of the hilly characteristic is not suitable for control because the motor speed abruptly decreases.

To actuate the vibration type motor, the frequency is gradually decreased from a start-up frequency fo to increase the speed. Since control becomes difficult for the speed at position o or higher, the speed has conventionally been limited not to lower a frequency fh (at position o) for obtaining a maximum speed Vmax by storing the frequency fh in the memory of the control device.

In this way, the speed limit frequency must be conventionally used to obtain the maximum driving speed under stable control, which complicates the control. In addition, the vibration type motor actually starts rotating at different start-up frequencies depending on the temperature. If the start-up frequency is set regardless of the temperature, the time to start activation becomes long.

When a plurality of vibration type motors are controlled at a common maximum speed, variations in maximum speeds of the motors may cause a failure at the same maximum speed.

SUMMARY OF THE INVENTION

One aspect of the application is to provide a control device for a vibration type motor which relatively drives a vibration member excited to vibrate by electromechanical energy conversion, and a contact member in contact with the vibration member, comprising temperature detecting means for detecting a temperature of the vibration type motor, and speed setting means for setting a maximum driving speed of the vibration type motor in accordance with the temperature detected by the temperature detecting means, wherein driving is controlled using the set speed as an upper limit.

One aspect of the application is to provide a driving device for a vibration type motor in which a periodic signal is applied to an electromechanical energy conversion element portion arranged on a vibration member to obtain a driving force, comprising temperature detecting means for measuring a temperature of or near the motor, frequency setting means for setting an initial frequency of the periodic signal upon actuating the motor to a frequency corresponding to the temperature detected by the temperature detecting means, and control means for shifting the frequency from the set frequency to a lower frequency to actuate the motor.

One aspect of the application is to provide a driving device for a plurality of vibration type motors in which periodic signals are applied to an electromechanical energy conversion element portion arranged on a vibration member of each motors to obtain a driving force, the driving device driving the motors at a common maximum speed, comprising speed information setting means for setting, as a maximum speed common to the motors, the lowest speed out of speeds of the motors when a frequency of the periodic signal for each motor becomes higher than a resonant frequency or a frequency near and higher than the resonant frequency, and control means for controlling the speed of each motor using the speed set by the setting means as a maximum speed.

The above and other objects of the present invention will be apparent from the following description in conjunction with the accompanying drawings.

BRIEF DESCRIPTION OF THE DRAWINGS

FIGS. 1A–B are block diagrams showing a control device for a vibration type motor according to different embodiments of the present invention;

FIG. 2 is a graph showing the relationship between the frequency and rotational speed of the vibration type motor;

FIG. 3 is a table showing the temperature and commanded maximum speed;

FIG. 4 is a graph showing the relationship between the temperature and commanded maximum speed;

FIG. 10 is a graph showing the characteristics of the vibration type motor at the same temperature;

FIG. 11 is a table showing the temperature, maximum speed, and start-up frequency;

DETAILED DESCRIPTION OF THE PREFERRED EMBODIMENTS (First Embodiment)

Figure 1B:
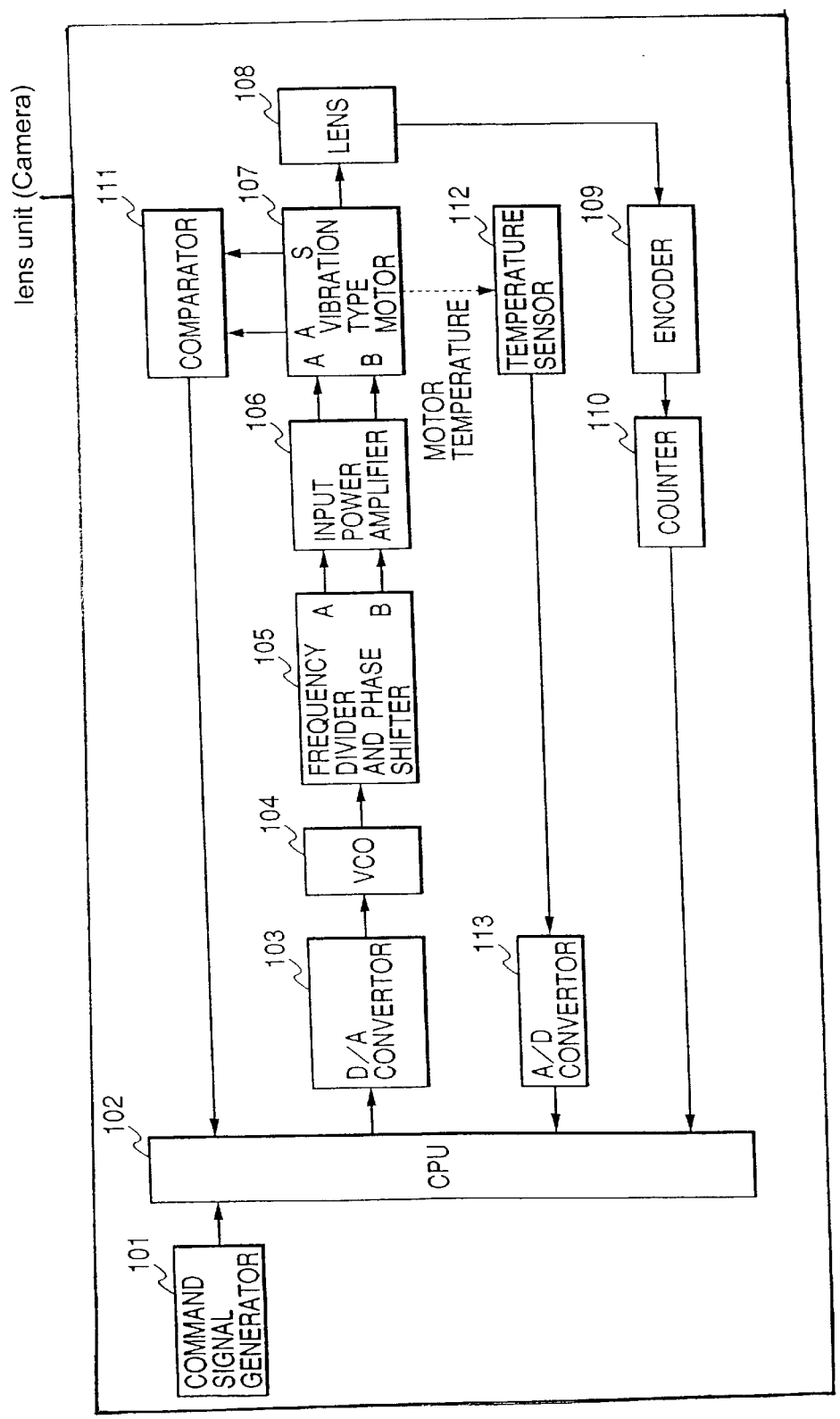

FIG. 1 shows the arrangement of a control device for a vibration type motor according to the first embodiment of the present invention. Referring to FIG. 1, a D/A convertor 103 converts a digital output signal from a microcomputer (CPU) 102 into a voltage output. A VCO 104 outputs a periodic voltage corresponding to the output voltage obtained by the D/A convertor 103.

A frequency divider and phase shifter 105 divides the frequency of the periodic voltage output from the VCO 104 to output rectangular waves A and B having a phase difference of $\pi/2$ between them. An input power amplifier 106 amplifies the periodic voltage from the frequency divider and phase shifter 105 to a voltage and current capable of driving a vibration type motor 107. The vibration type motor 107 generates a travelling vibration wave on the surface of a vibration member by applying the periodic voltages A and B from the input power amplifier 106 to an electromechanical energy conversion element portion arranged on the vibration member constituting the motor, thereby rotating a moving member (contact member) in contact with the vibration member.

An encoder 109 is mechanically connected to a lens 108 together with a counter 110 to detect the moving amount of the lens 108. A comparator 111 detects the phase difference between a sensor electrode S incorporated in the vibration type motor 107 and the applied periodic voltage A, and informs the CPU 102 of a resonance state of the vibration type motor.

The CPU 102 calculates the difference between target position information indicated by a command signal generator 101 and position information of the lens 108 obtained by the counter 110, and outputs a digital signal indicating a rotational speed to the D/A convertor 103 so as to make the lens position coincide with the target position.

A temperature sensor (temperature detecting means) 112 is arranged near or inside the vibration type motor 107 and detects the temperature of the motor itself. An analog output from the temperature sensor 112 is converted into a digital signal by an A/D convertor 113, and the digital signal is input to the CPU 102.

FIG. 2 shows the relationship between the rotational speed and frequency of the vibration type motor at each temperature. For example, at position ○ on the graph for 25° C., the phase difference between the phases A and S detected by the comparator 111 in FIG. 1 is the minimum phase difference θ (not shown) with which the rotational speed of the vibration type motor 107 is stable. In this state, the rotational speed is V25.

The vibration type motor 107 is controlled using a down slope portion of each graph in FIG. 2. To always control the vibration type motor 107 within this slope, the control device in FIG. 1 always controls the phase difference so as not to lower θ.

In the right range (higher frequency range) from position ○ on, e.g., the graph for 25° C. in FIG. 2, each graph in FIG. 2 and the phase difference between the phases A and S for monitoring the stability of the vibration type motor 107 increases, and thus the motor can be stably controlled. In the left range (lower frequency range) from position ○, the phase difference decreases. Nearer the left side, the rotational speed is maximized to reach its peak with respect to the frequency. At a frequency slightly lower than this, the motor hardly rotates. In FIG. 2, the graphs for respective temperatures exhibit rotational speeds of V50 and V-20 for temperatures of 50° C. and −20° C. with the minimum phase difference θ.

FIG. 3 shows the correspondence between the motor temperature and the commanded maximum speed when a speed slightly lower than the rotational speed of the vibration type motor 107 such as V25, V50, or V-20 obtained in FIG. 2 is set as a commanded maximum speed value. In the first embodiment, this correspondence (table) is stored in a nonvolatile memory (not shown) incorporated in the CPU 102. The rotational speed such as V25 corresponding to the minimum phase difference θ at each temperature is measured in advance.

As shown in FIG. 2, the rotational speed characteristic with respect to the frequency for each temperature is hilly. In some vibration type motors, even if the temperature is kept constant, the hilly graph shifts less toward the speed axis but toward the frequency axis upon variations in mechanical load. The control device of the present invention is particularly preferable for such a vibration type motor.

In this vibration type motor, even if the hilly graph shifts right or left, the maximum speed value does not change though the driving frequency for obtaining the maximum speed changes. The vibration type motor 107 is controlled by the control device having the arrangement in FIG. 1, and if the hilly graph shifts right or left, the driving frequency can be changed to always keep the maximum speed.

Note that when the driving frequency corresponding to the maximum speed for a certain temperature is stored as a target control value in the memory to control the vibration type motor, the target maximum speed may not be obtained owing to variations in mechanical load, or the vibration type motor itself may fail to rotate in the worst case. For this reason, in the present invention, the target maximum speed is stored in the memory to control the vibration type motor.

Figure 5:
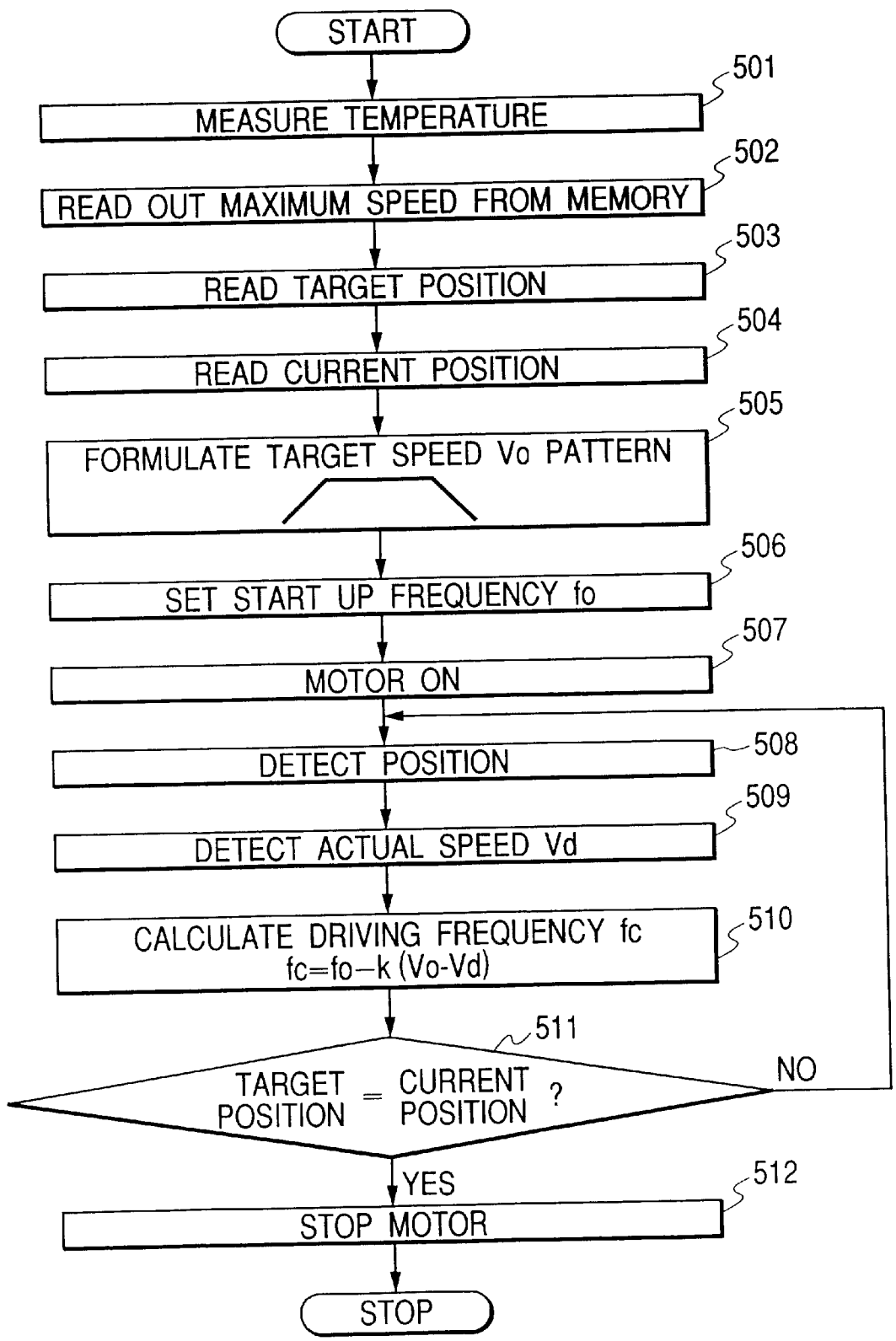
FIG. 5 is a flow chart showing operation of the control device.

Operation of the control device (particularly the CPU 102) according to the first embodiment will be explained with reference to the flow chart in FIG. 5. In step 501, the temperature of the vibration type motor 107 is measured by the temperature sensor 112. In step 502, maximum speed data is read out from the nonvolatile memory in the CPU 102 on the basis of the measured temperature.

Figure 15:
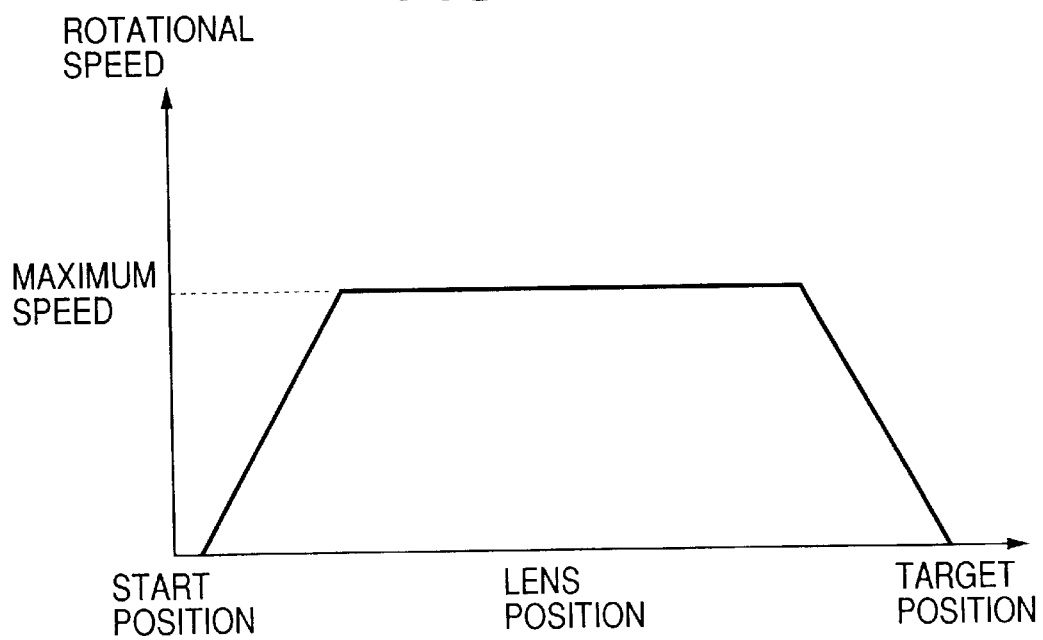
FIG. 15 is a graph showing the relationship between the lens position and motor rotational speed in lens control.

In step 503, a target lens position indicated by the command signal generator 101 is read. In step 504, a current lens position is read by the encoder 109. In step 505, a target speed pattern (Vo) shown in FIG. 15 is calculated and formulated from the target position, current position, and maximum speed data. The maximum speed on the pattern of FIG. 15 changes depending on the maximum speed data read out from the memory.

In step 506, a start-up frequency fo (highest frequency at the right end of the hilly graph in FIG. 2) of the vibration type motor 107 is set. In step 507, the vibration type motor 107 is turned on, and the frequency is gradually decreased to increase the motor rotational speed.

In step 508, the current lens position is confirmed by the encoder 109, and digital data corresponding to the target speed Vo for the lens position on the target speed pattern formulated in step 505 is output to the D/A convertor 103. In step 509, a lens speed Vd is detected from an output signal from the encoder 109.

In step 510, a driving frequency fc is calculated from the difference between the target speed Vo and the lens speed Vd. More specifically, the driving frequency fc is $$fc = fo - k(Vo - Vd)$$

where k is the gain.

In step 511, whether the lens position reaches the target position is checked. If YES in step 511, the flow shifts to step 512 to stop the vibration type motor 107. If NO in step 511, the flow returns to step 508.

FIG. 4 shows commanded maximum speed data shown in FIG. 3 which are plotted by ○ and connected by straight lines between ○. A commanded maximum speed for a given temperature not on the table in FIG. 3 is obtained as data on a straight line between ○ in FIG. 4 by approximating data corresponding to the temperature on the table near the given temperature.

For example, letting Tx be a certain temperature, T1 and T2 be temperatures near Tx, V1 be a maximum speed at T1, and V2 be a maximum speed at T2, a maximum speed Vx at Tx is given by $$Vx = (V2 - V1) \times (Tx - T1)/(T2 - T1) + V1$$

Data calculation in FIG. 4 can be performed by two methods. One method is to store only data in FIG. 3 in the nonvolatile memory (not shown) in the CPU 102 and solve the above equation of Vx by the CPU 102. According to this method, the memory amount can be suppressed small, but the calculation time is long.

The other method is to calculate in advance data for detailed temperatures from data obtained in FIG. 3 and store all the resultant data in the nonvolatile memory in the CPU 102. According to this method, the memory amount increases, but the processing time of the CPU 102 is short without any calculation.

In this manner, commanded maximum speeds for the vibration type motor 107 are interpolated by temperatures. Even if the temperature environment of a lens barrel or camera using the vibration type motor 107 as a driving source changes during the use of the vibration type motor 107, the maximum motor speed can smoothly change to maximize the performance of the vibration type motor 107 and allow the user to naturally use the camera.

As a memory for storing data shown in FIGS. 3 and 4, an erasable EEPROM or the like can be used to rewrite maximum speed data upon deterioration of the motor over time or during the exchange of motors. Since data for each vibration type motor can be stored, the manufacturing yield of the vibration type motor can be increased by adopting vibration type motors selected based on different maximum speeds for products each requiring an optimum maximum speed.

(Second Embodiment)

Figure 6:
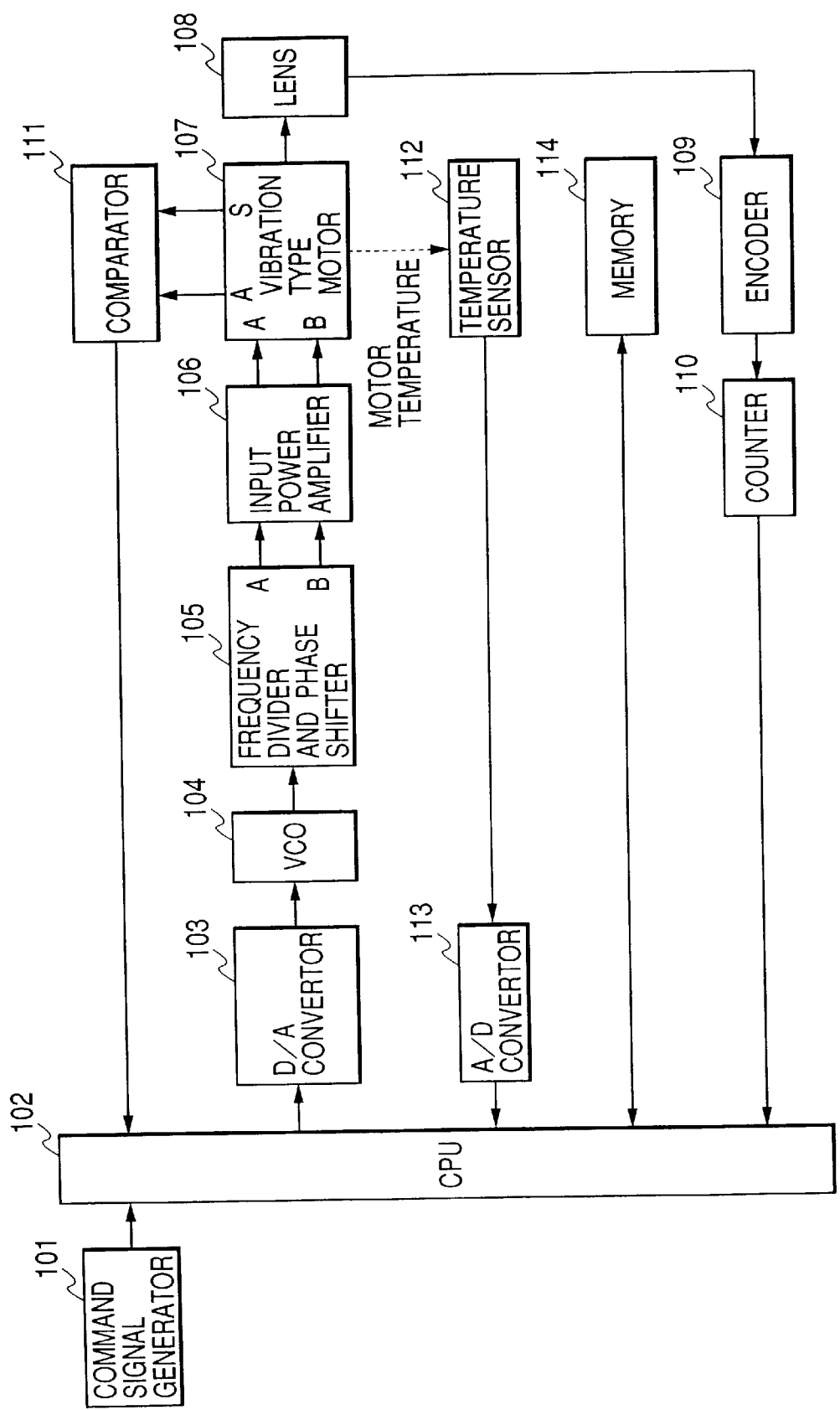
FIG. 6 is a block diagram showing a control device for a vibration type motor according to the second embodiment of the present invention.
Figure 8:
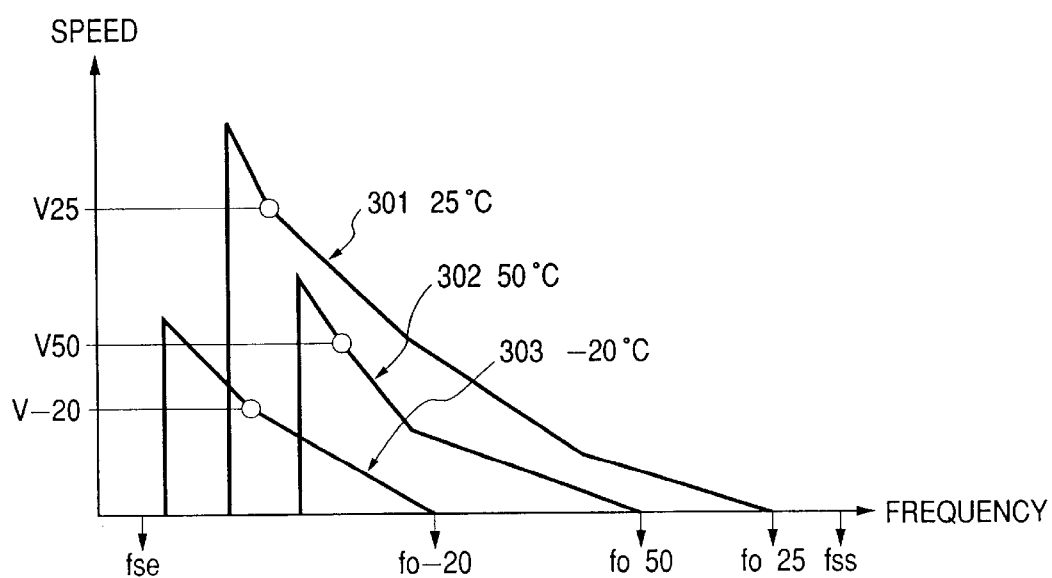
FIG. 8 is a graph showing the relationship between the frequency, rotational speed, and start-up frequency of the vibration type motor.
Figure 9:
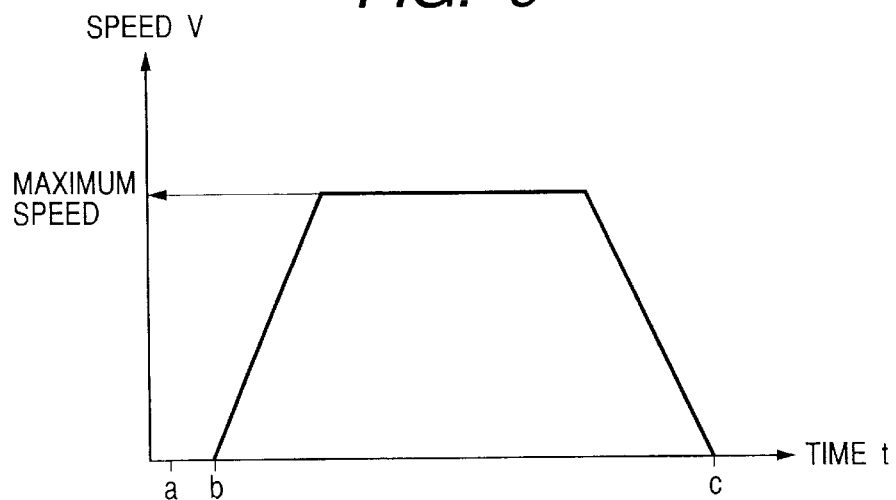
FIG. 9 is a graph showing the time required for the vibration type motor to start rotating.

FIG. 6 is a block diagram showing the arrangement of a control device according to the second embodiment of the present invention. In FIG. 6, the same reference numerals as in FIG. 1 denote the same parts. Referring to FIG. 6, speed data corresponding to maximum speeds in relation to temperatures (to be described later), and start-up frequency data are stored in a memory 114. FIG. 8 shows the relationship between the speed and frequency of the vibration type motor at each temperature. The temperature and minimum phase difference θ in FIG. 8 have the same relationship as in FIG. 2. fo-20, fo50, and fo25 represent frequencies at which the motor starts rotating at respective temperatures. FIG. 9 shows the time required for the motor to start rotating upon activation. When a driving signal is supplied at a start-up frequency fss in FIG. 8 at time a in FIG. 9, the motor does not start rotating at a temperature of 25° C. until the frequency gradually shifts to fo25. When the frequency shifts to fo25, the motor starts rotating at time b (FIG. 9). Therefore, the motor can start rotating more quickly for a start-up frequency nearer the rotation start frequency. FIG. 10 shows a change in speed characteristic upon variations in mechanical load when the temperature is constant at 25° C. Referring to FIG. 10, the load for a standard speed characteristic 501 varies to change the rotation start frequency from fo25 typical to fo25 max. Considering the variations, it is desirable for quick activation to set the maximum start-up (sweep) frequency to a frequency fss25 higher by a predetermined frequency from the start-up frequency on the standard characteristic.

Figure 12:
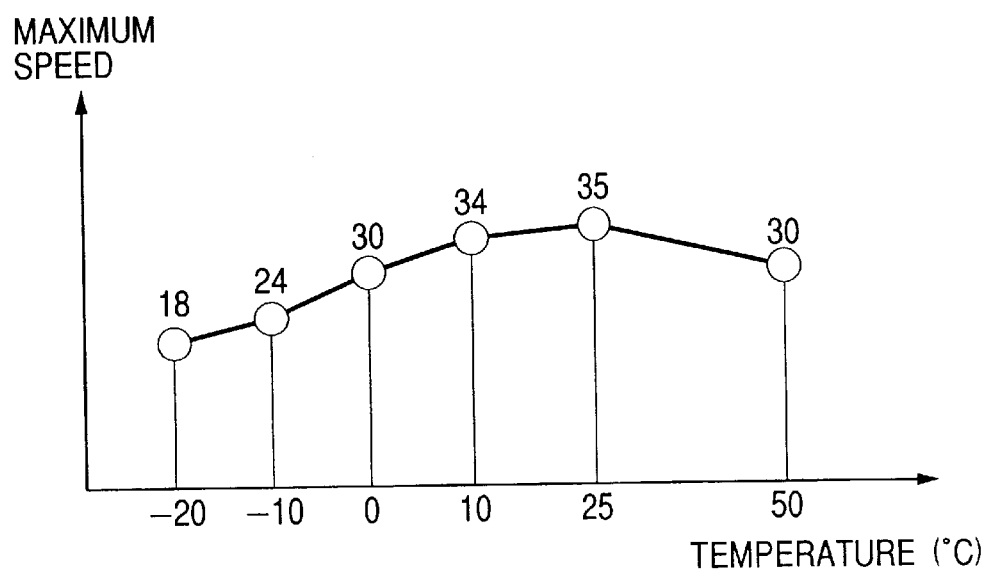
FIG. 12 is a graph showing the relationship between the temperature and maximum speed.
Figure 13:
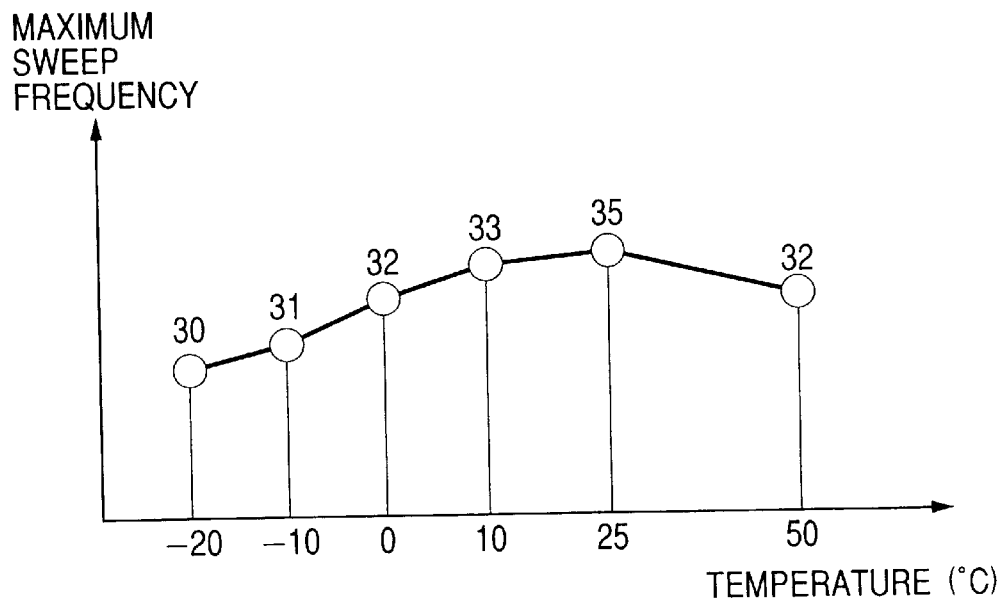
FIG. 13 is a graph showing the relationship between the temperature and start-up frequency.

FIG. 11 is a table showing maximum speed data and a start-up frequency obtained for each temperature in consideration of the above situation. This table is stored in the nonvolatile memory 114. FIG. 12 is a graph showing the relationship between the temperature and maximum speed in FIG. 11, similar to FIG. 4. Maximum speeds for temperatures other than the temperatures in FIG. 12 can be obtained by the same method as in the first embodiment. FIG. 13 is a graph showing the relationship between the temperature and start-up (sweep) frequency data in FIG. 11. Frequencies for temperatures not shown in FIG. 13 can be obtained by the same method as for the speed.

As the memory 114, an erasable memory such as an EEPROM can be used to rewrite the commanded maximum speed and start-up frequency upon deterioration of the motor over time or during the exchange of motors. If motors are selected based on different maximum speeds, they can be applied to products each requiring an optimal maximum speed, thereby increasing the manufacturing yield of the motor.

Figure 7:
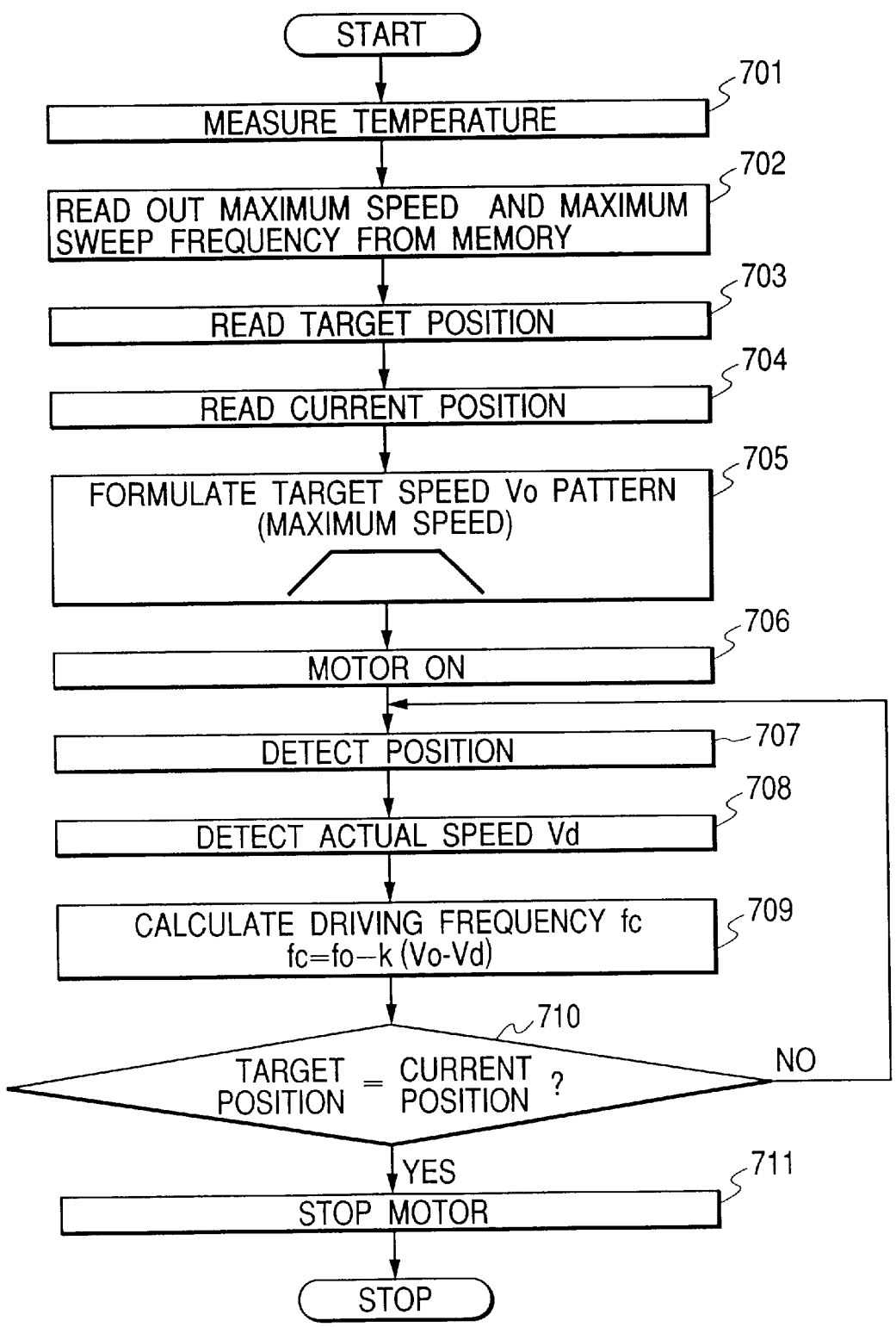
FIG. 7 is a flow chart showing operation of the device in FIG. 6.

Operation of the control device (particularly a CPU 102) according to the second embodiment will be explained with reference to the flow chart in FIG. 7. In step 701, the temperature of a vibration type motor 107 is measured by a temperature sensor 112. In step 702, maximum speed data and maximum start-up (sweep) frequency data are read out from the memory 114 on the basis of the measured temperature.

In step 703, a target lens position indicated by a command signal generator 101 is read. In step 704, a current lens position is read by an encoder 109. In step 705, the target speed pattern (Vo) shown in FIG. 15 is calculated and formulated from the target position, current position, and maximum speed data. The maximum speed on the pattern is set in accordance with the readout speed data, and the start-up frequency is set to the readout frequency data.

In step 706, the vibration type motor 107 is turned on, and the frequency is gradually decreased from the readout frequency to increase the motor rotational speed.

In step 707, the current lens position is confirmed by the encoder 109, and digital data corresponding to the target speed Vo for the lens position on the target speed pattern formulated in step 705 is output to a D/A convertor 103. In step 708, the lens speed Vd is detected from an output signal from the encoder 109.

In step 709, the driving frequency fc is calculated from the difference between the target speed Vo and the lens speed Vd. More specifically, the driving frequency fc is $fc=fo-k(Vo-Vd)$ where k is the gain.

In step 710, whether the lens position has reached the target position is checked. If YES in step 710, the flow shifts to step 711 to stop the vibration type motor 107. If NO in step 710, the flow returns to step 707.

Figure 14:
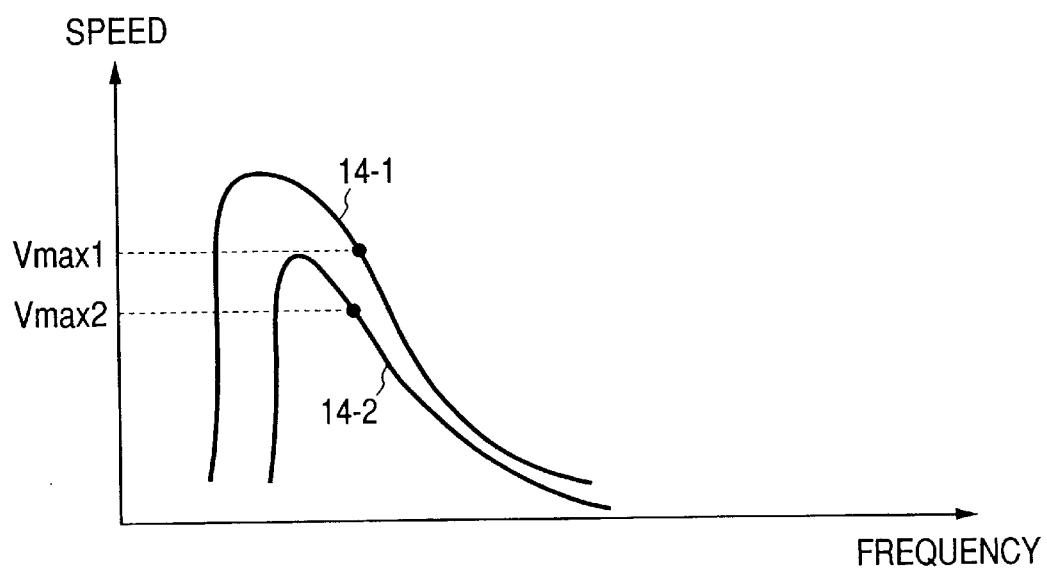
FIG. 14 is a graph showing the characteristics of different vibration type motors.

FIG. 14 shows an example of the characteristics of motors having different maximum speeds in a device for driving a plurality of vibration type motors at the same maximum speed. Referring to FIG. 14, a motor 14-1 has a maximum speed Vmax1, and a motor 14-2 has a maximum speed Vmax2. To drive the motors by the present invention, maximum speed data of a motor having the lowest maximum speed at each temperature is used as control data common to motors. In this example, the maximum speed of motor 14-2 is used as control data. Depending on a driving device, different activation times of a plurality of vibration type motors must be made equal. In this example, however, the activation times suffice to be corrected by the control circuit.

In a device suffering problems caused by variations in activation times of vibration type motors, a motor having the longest activation time which copes with a device using this motor must be selected from a plurality of motors.

A plurality of motors must be controlled at the same maximum speed when, for example, tilt and panning operations are performed by separate motors in a remote-control pan head on which both a remote-control television lens and a television camera are mounted, and the tilt and panning operations are simultaneously completed to a target photographing position within the shortest time.

Figure 16:
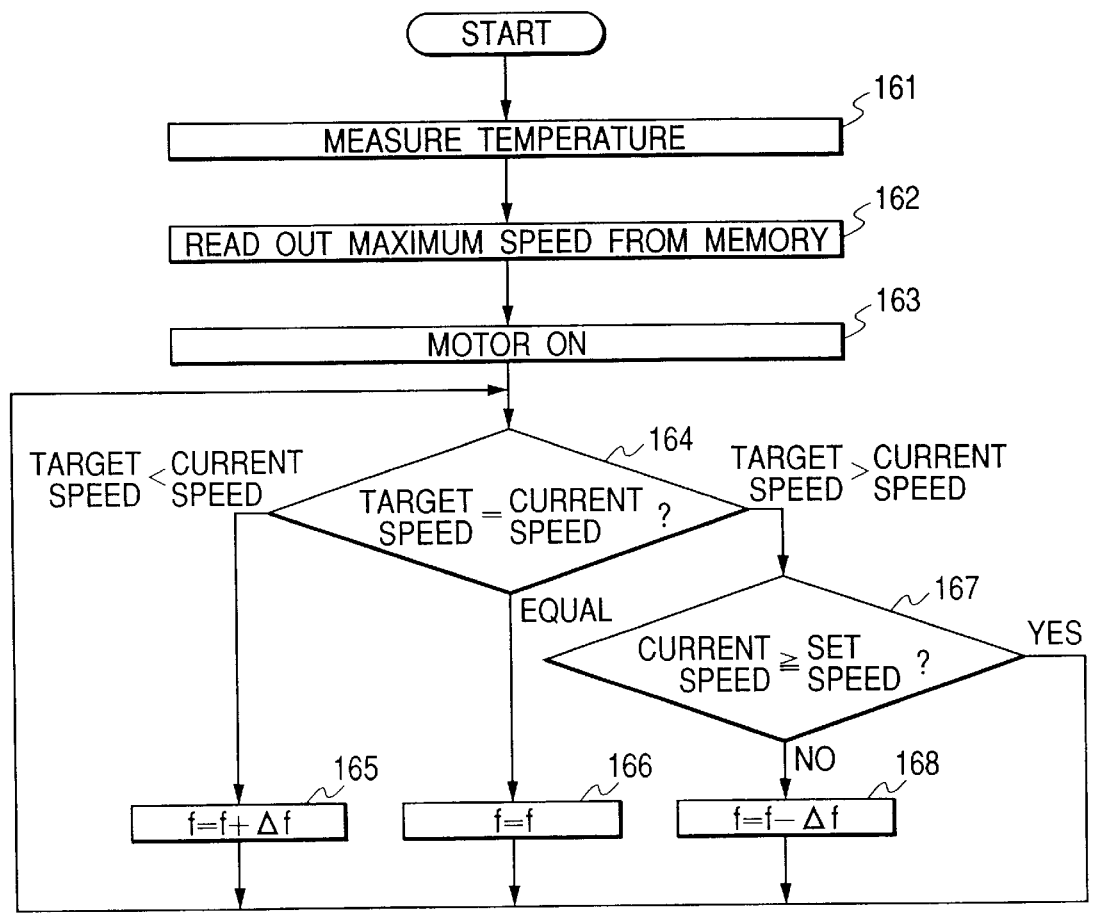
FIG. 16 is a flow chart showing another control of driving the motor in the present invention.
Figure 17:
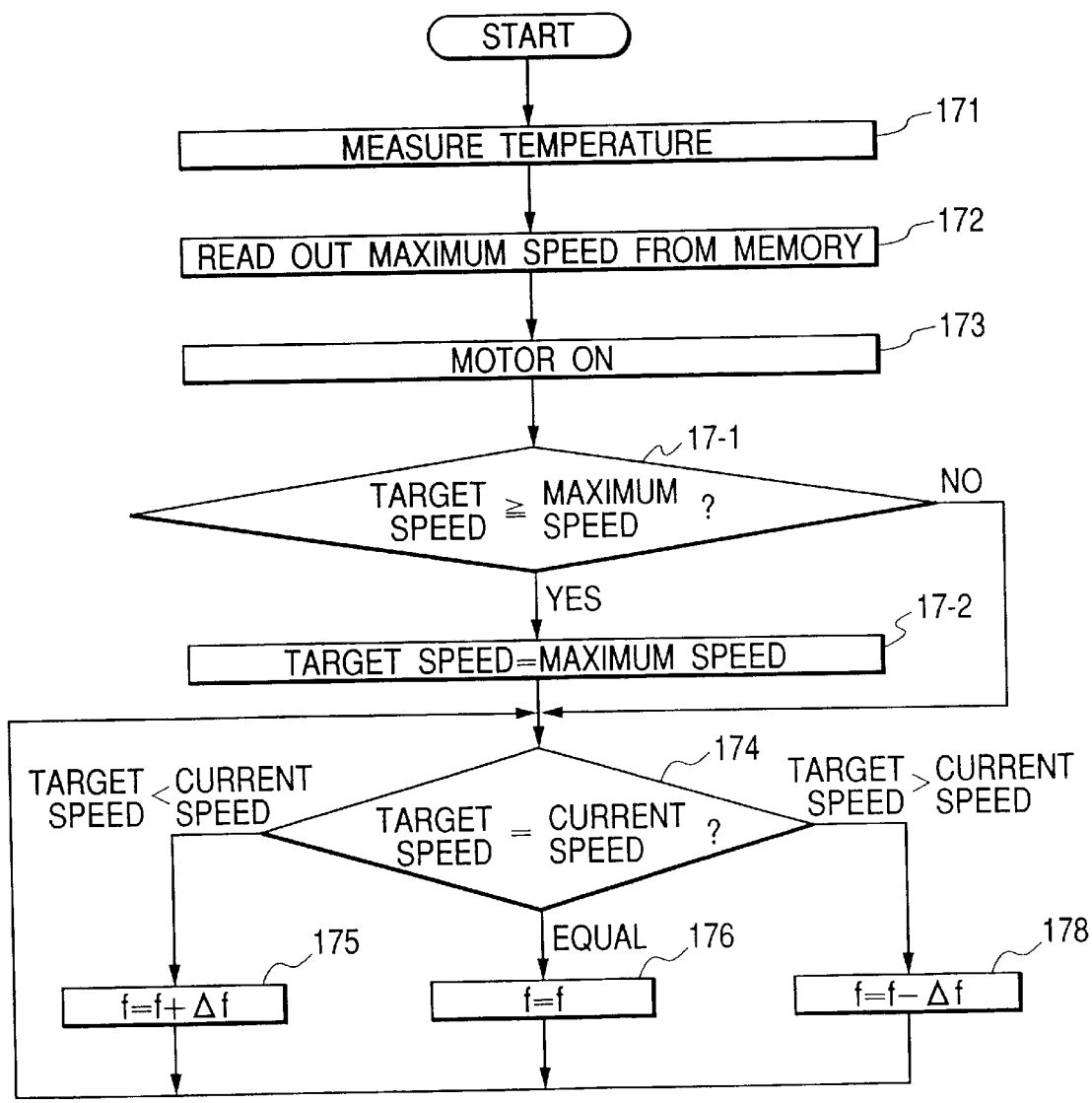
FIG. 17 is a flow chart showing still another control of driving the motor in the present invention.
Figure 18:
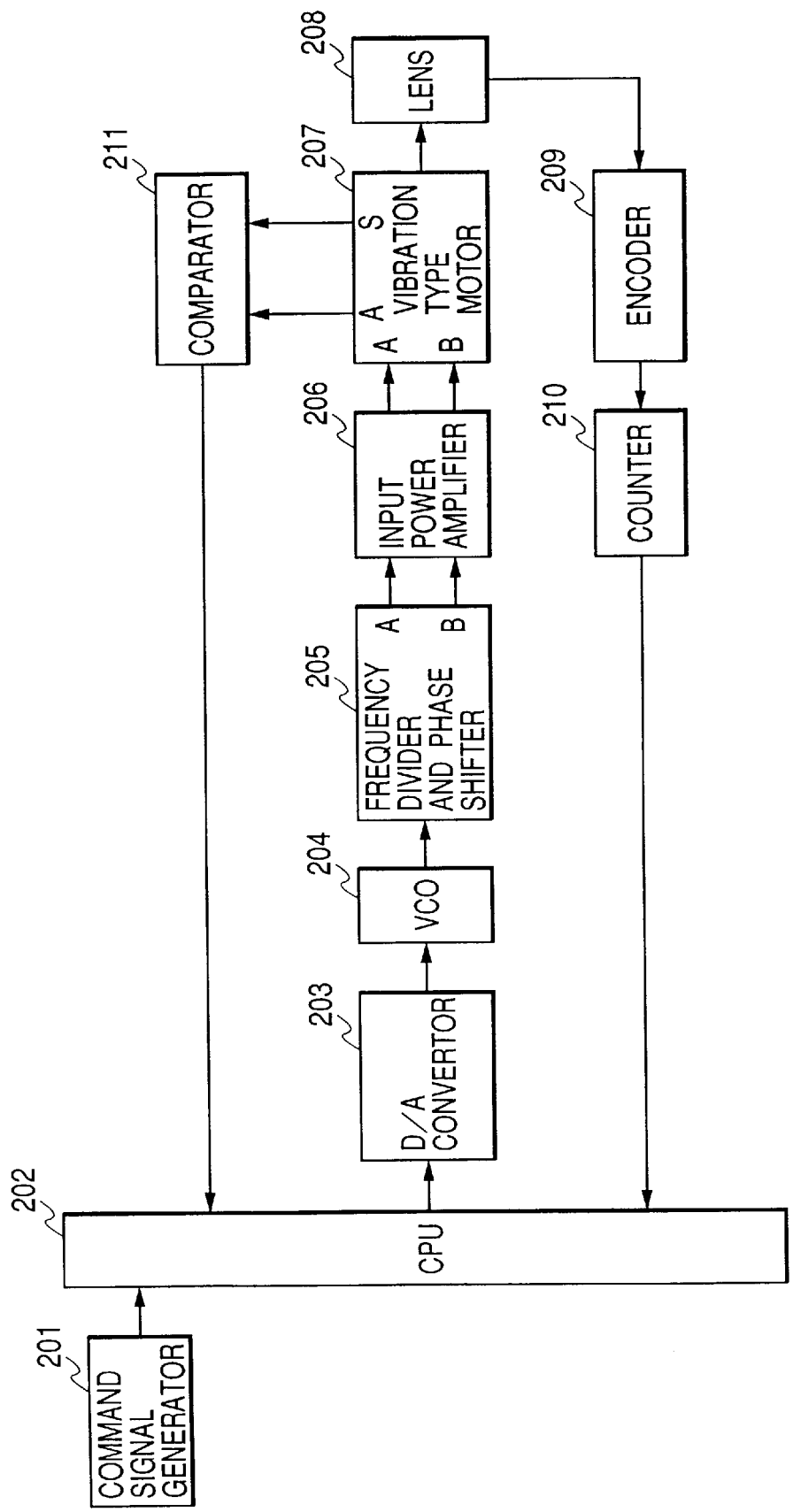
FIG. 18 is a block diagram showing a conventional control device for a vibration type motor.
Figure 19:
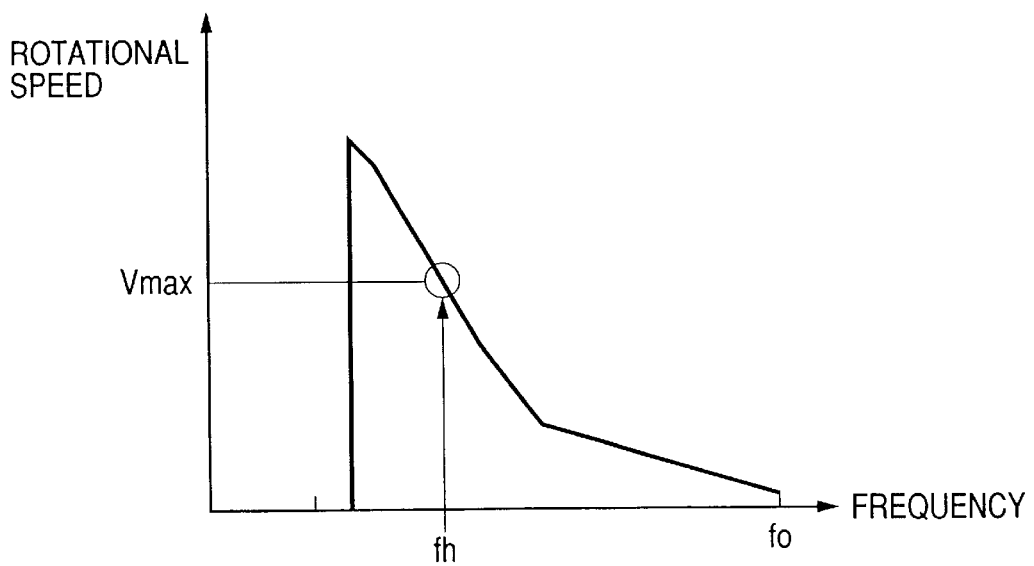
FIG. 19 is a graph for explaining the conventional control of the vibration type motor.

In the above embodiments, a speed pattern attaining the maximum speed is formed to control the motor speed. Instead, as control of the motor speed, stored maximum speeds corresponding to respective temperatures may be selected in accordance with a temperature, the rotational speed during the driving of the motor to a target speed may be detected by the encoder, and when the detected speed reaches the selected maximum speed, the motor may be inhibited from shifting to a lower frequency. FIG. 16 shows a control flow in this arrangement. In this flow, the temperature is measured in step 161. In step 162, maximum speed data corresponding to the measured temperature is read out. In step 163, the motor is turned on. In step 164, a current motor speed are detected and compared with a commanded target speed. If the current speed does not reach the target speed yet, the flow shifts to step 167. If the current speed is determined in step 167 to be lower than the maximum speed, the flow advances to step 168 to decrease the frequency by a predetermined value, and returns to step 164. If the current speed is determined in step 164 to reach the target speed, the frequency is kept unchanged. If the current speed is determined in step 164 to be higher than the target speed, the frequency is increased in step 165. If the current speed is determined in step 167 to be equal to or higher than the maximum speed, the frequency is inhibited from decreasing even if the current speed does not reach the target speed. This flow can be realized in the device arrangement shown in FIG. 6 by setting a target speed from the command signal generator 101 and inputting a signal from the encoder 109 to the CPU 102 to detect the current motor speed. As another example of the flow, when the target speed is higher than the maximum speed, the target speed itself may be set as a maximum speed, as in steps 17-1 and 17-2 in the flow of FIG. 17.

The above embodiments have exemplified the lens barrel for driving the lens using the vibration type motor as a driving source. However, the present invention can also be applied to various devices for driving members other than the lens. The above embodiments have described control of the vibration type motor for moving the moving member (contact member) with respect to the vibration member. The present invention can also be applied to control of a vibration type motor for moving the vibration member with respect to the contact member.

What is claimed is:

1. A control device for a vibration type motor in which a periodic signal is applied to an electro-mechanical energy conversion element portion arranged on a vibration member to obtain a driving force, comprising:

temperature detecting means for detecting a temperature of or near the vibration type motor;

speed setting means for setting a maximum driving speed of the vibration type motor in accordance with the temperature detected by said temperature detecting means; and a driving control circuit for controlling driving using the maximum driving speed set by said speed setting means as an upper limit, said driving control circuit including a speed detecting circuit for detecting a rotational speed of the vibration type motor, and controlling the driving speed of the motor by comparing the detected rotational speed with the maximum driving speed set by said speed setting means so as not to exceed the maximum driving speed.

2. A device according to claim 1, wherein said speed setting means includes nonvolatile storing means for storing the maximum driving speed corresponding to the temperature detected by said temperature detecting means.

3. A device according to claim 1, wherein said speed setting means includes nonvolatile storing means for storing an erasable maximum driving speed corresponding to the temperature detected by said temperature detecting means.

4. A device according to claim 1, wherein said speed setting means includes calculating means for calculating the maximum driving speed on the basis of the temperature detected by said temperature detecting means.

5. A device according to claim 1, wherein said speed setting means includes storing means for storing nonvolatile information for making the temperature detected by said temperature detecting means and the maximum driving speed correspond to each other.

6. A driving device for a vibration type motor in which a periodic signal is applied to an electro-mechanical energy conversion element portion arranged on a vibration member to obtain a driving force, comprising:

temperature detecting means for measuring a temperature of or near the motor;

speed information setting means for setting speed information corresponding to the temperature detected by said temperature detecting means;

control means for limiting a maximum speed of the motor on the basis of the speed information set by said setting means; and wherein said control means includes rotational state detecting means for detecting information in accordance with a rotational speed of the motor, controls a frequency of the periodic signal and the maximum speed of the motor by comparing the information corresponding to the detected speed with the speed information set by said setting means so as not to exceed the maximum driving speed.

7. A device according to claim 6, wherein said control means includes first control means for comparing a target speed with information corresponding to the speed detected by said rotational state detecting means, and changing the frequency of the periodic signal so as to shift the speed to the target speed, and second control means for inhibiting shift of the frequency of the periodic signal to a lower frequency even if the speed does not reach the target speed when information corresponding to the speed detected by said rotational state detecting means represents a speed corresponding to the speed information set by said setting means during speed control of said first control means.

8. A device according to claim 6, wherein speed information for each temperature is stored in memory means using each temperature as a factor, and said setting means comprises selecting means for selecting and setting speed information, stored in said memory means, in accordance with the temperature measured by said temperature detecting means.

9. A device according to claim 6, further comprising frequency setting means for setting an initial frequency of the periodic signal for actuating the motor to a frequency corresponding to the temperature detected by said temperature detecting means, and a start-up circuit for shifting the frequency from the set frequency to a lower frequency.

10. A device according to claim 9, wherein said frequency setting means sets, a frequency corresponding to a frequency at which the motor starts rotating at each temperature.

11. A device according to claim 9, wherein frequency information for each temperature is stored in a memory means using each temperature as a factor, and said frequency setting means includes selecting means for selecting and setting frequency information, stored in said memory means, in accordance with the temperature measured by said temperature detecting means.

12. A device according to claim 6, wherein said control means controls a speed using the speed information set by said setting means as a target speed when the speed information set by said setting means is lower than a commanded target speed.

13. A device according to claim 12, wherein said setting means sets speed information corresponding to a speed of the motor at each temperature when a frequency of the periodic signal becomes higher than a resonant frequency or a frequency substantially equal to the resonant frequency at each temperature.

14. A driving device for a vibration type motor in which a periodic signal is applied to an electro-mechanical energy conversion element portion arranged on a vibration member to obtain a driving force, comprising:

temperature detecting means for measuring a temperature of or near the motor;

frequency setting means for setting an initial frequency of the periodic signal for actuating on the motor to a frequency corresponding to the temperature detected by said temperature detecting means; and control means for shifting the frequency from the set frequency to a lower frequency to actuate the motor.

15. A device according to claim 14, wherein said frequency setting means sets, a frequency corresponding to a frequency at which the motor starts rotating at each temperature.

16. A device according to claim 14, wherein frequency information for each temperature is stored in a memory means using each temperature as a factor, and said frequency setting means includes selecting means for selecting and setting frequency information, stored in said memory means, in accordance with the temperature measured by said temperature detecting means.

17. A driving device for a plurality of vibration type motors in which a periodic signal is applied to an electro-echanical energy conversion element portion arranged on a vibration member of each motor to obtain a driving force, said driving device driving the motors at a common maximum speed, comprising:

speed information setting means for setting, as a maximum speed common to the motors, the lowest speed out of speeds of the motors when a frequency of the periodic signal for each motor becomes higher than a resonant frequency or a frequency near and higher than the resonant frequency; and control means for controlling the speed of each motor using the speed set by said setting means as a maximum speed.

18. A device according to claim 17, wherein the maximum speed is set to different speeds in accordance with temperatures.

19. A device according to claim 18, wherein said control means includes rotational state detecting means for detecting information in accordance with a rotational speed of the motor, first control means for comparing a target speed with information corresponding to the speed detected by said rotational state detecting means, and changing the frequency of the periodic signal to shift the speed to the target speed, and second control means for inhibiting shift of the frequency of the periodic signal to a lower frequency even if the speed does not reach the target speed when information corresponding to the speed detected by said rotational state detecting means represents a speed corresponding to the maximum speed set by said setting means during speed control of said first control means.

20. A device according to claim 18, wherein said control means sets the periodic signal for each motor to a frequency for driving the motor at the maximum speed in driving the motor at the maximum speed.

21. A control device for a camera in which a periodic signal is applied to an electro-mechanical energy conversion element portion arranged on a vibration member to obtain a driving force, comprising:

temperature detecting means for detecting a temperature of or near the vibration type motor;

speed setting means for setting a maximum driving speed of the vibration type motor in accordance with the temperature detected by said temperature detecting means; and a driving control circuit for controlling driving using the maximum driving speed set by said speed setting means as an upper limit, said driving control circuit including a speed detecting circuit for detecting a rotational speed of the vibration type motor, and controlling the driving speed of the motor by comparing the detected rotational speed with the maximum driving speed set by said speed setting means so as not to exceed the maximum driving speed.

22. A driving device for a camera in which a periodic signal is applied to an electro-mechanical energy conversion element portion arranged on a vibration member to obtain a driving force, comprising:

temperature detecting means for measuring a temperature of or near the motor;

speed information setting means for setting speed information corresponding to the temperature detected by said temperature detecting means;

control means for limiting a maximum speed of the motor on the basis of the speed information set by said setting means; and wherein said control means includes rotational state detecting means for detecting information in accordance with a rotational speed of the motor, controls a frequency of the periodic signal and the maximum speed of the motor by comparing the information corresponding to the detected speed with the speed information set by said setting means so as not to exceed the maximum driving speed.

23. A driving device for a camera in which a periodic signal is applied to an electro-mechanical energy conversion element portion arranged on a vibration member to obtain a driving force, comprising:

temperature detecting means for measuring a temperature of or near the motor;

frequency setting means for setting an initial frequency of the periodic signal for actuating on the motor to a frequency corresponding to the temperature detected by said temperature detecting means and control means for shifting the frequency from the set frequency to a lower frequency to actuate the motor.

24. A driving device for a plurality of cameras in which a periodic signal is applied to an electro-mechanical energy conversion element portion arranged on a vibration member of each motor of each of said plurality of cameras to obtain a driving force, said driving device driving the motors at a common maximum speed, comprising:

speed information setting means for setting a speed, said speed being set based on information regarding a maximum speed common to all said motors, wherein the maximum speed is equal to the lowest speed out of the speeds of all the motors at a point when a frequency of the periodic signal for each motor becomes higher than a lowest resonant frequency of all of said motor or a frequency near and higher than the lowest resonant frequency of all of said motor; and control means for controlling the speed of each motor, such that the speed of each motor is equal to a speed set by said speed information setting means as a maximum speed.

25. A control device for a lens barrel in which a periodic signal is applied to an electro-mechanical energy conversion element portion arranged on a vibration member to obtain a driving force, comprising:

temperature detecting means for detecting a temperature of or near the vibration type motor;

speed setting means for setting a maximum driving speed of the vibration type motor in accordance with the temperature detected by said temperature detecting means; and a driving control circuit for controlling driving using the maximum driving speed set by said speed setting means as an upper limit, said driving control circuit including a speed detecting circuit for detecting a rotational speed of the vibration type motor, and controlling the driving speed of the motor by comparing the detected rotational speed with the maximum driving speed set by said speed setting means so as not to exceed the maximum driving speed.

26. A driving device for a lens barrel in which a periodic signal is applied to an electro-mechanical energy conversion element portion arranged on a vibration member to obtain a driving force, comprising:

temperature detecting means for measuring a temperature of or near the motor;

speed information setting means for setting speed information corresponding to the temperature detected by said temperature detecting means;

control means for limiting a maximum speed of the motor on the basis of the speed information set by said setting means; and wherein said control means includes rotational state detecting means for detecting information in accordance with a rotational speed of the motor, controls a frequency of the periodic signal and the maximum speed of the motor by comparing the information corresponding to the detected speed with the speed information set by said setting means so as not to exceed the maximum driving speed.

27. A driving device for a lens barrel in which a periodic signal is applied to an electro-mechanical energy conversion element portion arranged on a vibration member to obtain a driving force, comprising:

temperature detecting means for measuring a temperature of or near the motor;

frequency setting means for setting an initial frequency of the periodic signal for actuating on the motor to a frequency corresponding to the temperature detected by said temperature detecting means and control means for shifting the frequency from the set frequency to a lower frequency to actuate the motor.

28. A driving device for a plurality of lens barrels in which a periodic signal is applied to an electro-mechanical energy conversion element portion arranged on a vibration member of each motor of each of said plurality of cameras to obtain a driving force, said driving device driving the motors at a common maximum speed, comprising:

speed information setting means for setting a speed, said speed being set based on information regarding a maximum speed common to all said motors, wherein the maximum speed is equal to the lowest speed out of the speeds of all the motors at a point when a frequency of the periodic signal for each motor becomes higher than a lowest resonant frequency of all of said motor or a frequency near and higher than the lowest resonant frequency of all of said motor; and control means for controlling the speed of each motor, such that the speed of each motor is equal to a speed set by said speed information setting means as a maximum speed.

29. A control device for an optical apparatus in which a periodic signal is applied to an electro-mechanical energy conversion element portion arranged on a vibration member to obtain a driving force, comprising:

temperature detecting means for detecting a temperature of or near the vibration type motor;

speed setting means for setting a maximum driving speed of the vibration type motor in accordance with the temperature detected by said temperature detecting means; and a driving control circuit for controlling driving using the maximum driving speed set by said speed setting means as an upper limit, said driving control circuit including a speed detecting circuit for detecting a rotational speed of the vibration type motor, and controlling the driving speed of the motor by comparing the detected rotational speed with the maximum driving speed set by said speed setting means so as not to exceed the maximum driving speed.

30. A driving device for an optical apparatus in which a periodic signal is applied to an electro-mechanical energy conversion element portion arranged on a vibration member to obtain a driving force, comprising:

temperature detecting means for measuring a temperature of or near the motor;

speed information setting means for setting speed information corresponding to the temperature detected by said temperature detecting means;

control means for limiting a maximum speed of the motor on the basis of the speed information set by said setting means; and wherein said control means includes rotational state detecting means for detecting information in accordance with a rotational speed of the motor, controls a frequency of the periodic signal and the maximum speed of the motor by comparing the information corresponding to the detected speed with the speed information set by said setting means so as not to exceed the maximum driving speed.

31. A driving device for an optical apparatus in which a periodic signal is applied to an electro-mechanical energy conversion element portion arranged on a vibration member to obtain a driving force, comprising:

temperature detecting means for measuring a temperature of or near the motor;

frequency setting means for setting an initial frequency of the periodic signal for actuating on the motor to a frequency corresponding to the temperature detected by said temperature detecting means and control means for shifting the frequency from the set frequency to a lower frequency to actuate the motor.

32. A driving device for a plurality of optical apparatuses in which a periodic signal is applied to an electro-mechanical energy conversion element portion arranged on a vibration member of each motor of each of said plurality of cameras to obtain a driving force, said driving device driving the motors at a common maximum speed, comprising:

speed information setting means a speed, said speed being set based on information regarding a maximum speed common to all said motors, wherein the maximum speed is equal to the lowest speed out of the speeds of all the motors at a point when a frequency of the periodic signal for each motor becomes higher than a lowest resonant frequency of all of said motor or a frequency near and higher than the lowest resonant frequency of all of said motor; and control means for controlling the speed of each motor, such that the speed of each motor is equal to a speed set by said speed information setting means as a maximum speed.

* * * * *